V. BEAUMONT.
Pressure Gage.
No. 24,365.
Patented June 14, 1859.
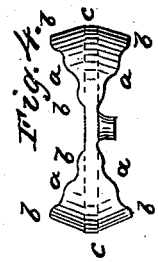
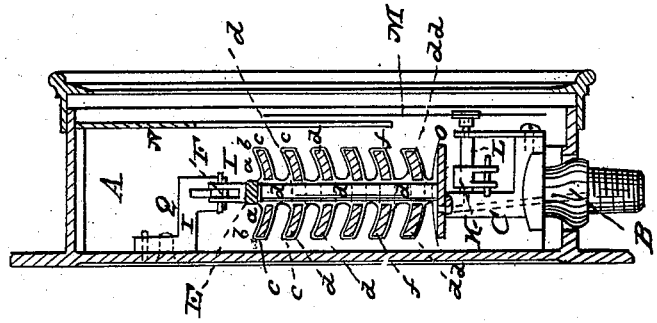
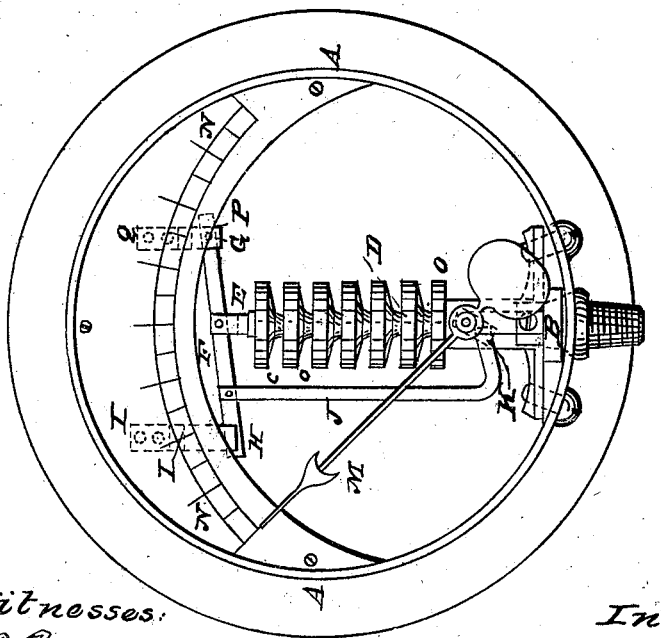
Witnesses:
Inventor:

UNITED STATES PATENT OFFICE.

VICTOR BEAUMONT, OF NEW YORK, N. Y.

GAGE FOR MEASURING THE PRESSURE OF FLUIDS.

Specification of Letters Patent No. 24,365, dated June 14, 1859.

*To all whom it may concern:*

Be it known that I, VICTOR BEAUMONT, of New York, in the county and State of New York, have invented a new and Improved Gage for Measuring the Pressure of Fluids; and I do hereby declare that the following is a full, clear, and exact description thereof, reference being had to the accompanying drawing and to the letters of reference marked thereon.

The nature of my invention consists in the use and employment in pressure gages of one, or more pairs of disks combined, said disks being of a dome shape, whether corrugated or not, and united at their edges so as to form lenticular bodies which are concave on one side, and convex on the other; also in guiding the free end of the spring so as to avoid vibrations of the index when the gage is shaken; and in filling the hollow space of each individual spring so as to leave room only for so small a quantity of vapor, gas or liquid as will not injure the gage either by too high or too low a temperature.

To enable others skilled in the art to make, construct and use my invention I will now proceed to describe its construction and operation.

A, A, represents the case of the gage; B is a stand to be screwed on a pipe leading from the boiler or other vessel from which the fluid, the pressure of which is to be measured, emanates; C a passage to let the fluid into the gage; E the movable end of the spring; F the lever by means of which the motion of the spring is multiplied. This lever has its fulcrum at one end marked G, while its other end H moves and is guided between the two branches of a fork projecting from the bracket I. To this lever is jointed the rod J, which transmits the movement of the lever to the crank K, spindle L and index M.

N is a dial which has to be properly graduated according to the conventional units used, for indicating pressure of different fluids or vacuum.

The spring D, E of my gage is made of one or more chambers communicating the one with the other; each chamber being made of two plates, the edges of which overlap each other and are soldered or otherwise secured together. The shape of the upper plate *a, a,* is that of a spherical cup, having its edges bent downward so as to present a rigid rim *c, c*. The lower plate is shaped similarly to the former, with the exception that its edges are turned upward, so as to form a rigid rim, which either over or under laps the rim of the other cup. Thus the two cups will have their surfaces parallel to each other, and will form a lenticular body as above indicated. The pressure of steam or other fluid within the chamber, although pressing equally in every direction, will have but little effect when acting against the concave, its action being confined almost exclusively to its pressure against the convex surface which is the spring proper, while the lower disk or the concave surface mainly acts as a funnel through which condensed liquids, if there be any, run out. Sometimes I use dome shaped disks so arranged as to cause the pressure to act against the convex surfaces in either direction, up and down, as shown in Fig. 3.

From the above it will be seen that the principle of my invention consists, in so arranging respectively dome shaped elastic disks of a spring chamber, as that the pressure of steam or other fluid be indicated by the motion of the plate which presents its convexity to the pressure; therefore I do not confine myself to smooth or plain surfaced disks, as, without affecting the principle of my invention, disks may be constructed corrugated in various ways to increase the sensitiveness of the spring. One end of the spring is soldered or otherwise secured to the stand at *o*, while the other end E, is prevented from vibrating in any direction but that of its axis, by guides I and Q, and pin P. In this connection I may state that, a spring mechanism constructed and arranged on my plan, possesses so much stiffness and rigidity that, on being shaken or struck no matter how violently, it is in no way subject to vibration; which is a principal objection to most of the gages and which render their use in locomotives unreliable. Sometimes I dispense with the lever F, by attaching the rod J to the head E; in such cases this head is longer and plays through an eye in a bracket, to prevent vibrating. Before soldering or otherwise securing the disks together, the hollow space between them is filled with pieces of a solid substance *d, d,* but in such a manner as not to interfere in any way with the free play of the spring. The substance of which I make use for filling the disks is bones, but any other substance which is not readily affected by heat or by contact with the different fluids under pressure, will answer the same purpose. This plan of mine of filling the gage with a solid substance presents several advantageous features, to wit: The empty space within each lenticular spring is so small as compared with the volume of its contents, that, but a very small quantity of the hot fluid can enter the gage and which coming in contact with comparatively a large extent of surface will be colored almost immediately. This will act as a preventive against the gage becoming too hot.

If a gage constructed on my plan be exposed to a very low temperature, so that its contents become frozen, the expansion on solidifying of the small quantity of liquid contained in it, will not be sufficient to materially affect the gage; but were the whole inner space filled with a liquid, the expansion of its bulk on freezing, might strain and injure the apparatus. As for example, I have found by experiment that, if a gage which is constructed for the maximum extension of $\frac{1}{8}$ of an inch, be completely filled with water and then allowed to freeze, the expansive power of the ice will extend the gage $\frac{3}{16}$ of an inch and consequently overstrain it and produce leakage. Another advantage which arises from the filling of the gage as before described, is that, the gage is not so readily deteriorated when the fluid has a chemical affinity for the metal of which the gage is made—as for instance salt water—on account of the quantity of the corroding agent which may come in contact with the metal being very small. When the solution is very strong, I place in the gage a few sheets of a metal more easily decomposed than brass or solder, in order to neutralize the solution before it has had time practically to injure the gage. Such a sheet is represented in Fig. 2 and marked $f, f$.

From the foregoing description it will be perceived that a gage constructed on my principle may be applied and adapted for measuring the pressure of all kind of fluids whether in a liquid or gaseous form; and as its sensitiveness is very delicate it can be adapted with great advantage for measuring the variations in the pressure of the atmospheric air, that is to say as a barometer. In the latter case the apparatus may be so constructed as that the gage either be inclosed in an air tight casing, constituting a vacuum; or a vacuum may be formed inside of the gage and the air allowed to press on its outer sides. Another advantageous feature of my gage is that, it is not liable to be affected by the changes in the temperature; the combination of convex disks with concave ones forms a compensating apparatus, so that no amount of change of temperature can alter materially the length of the spring.

Having thus described my invention what I claim as new and desire to secure by Letters Patent is—

1. So arranging respectively dome shaped elastic disks of one or more spring-chambers in pressure gages, as that the pressure of steam or other fluid within said chambers be indicated by the motion of the disk or plate which presents its convexity to the pressure.

2. The manner substantially as herein described of guiding the free end of a spring, consisting of one or more chambers expanding by pressure from within, in order to prevent it from vibrating in any direction but that of its axis.

3. In pressure gages with a hollow spring chamber mechanism, I claim partially filling the space inside of said chambers with a solid substance or substances in the manner and for the purposes set forth.

V. BEAUMONT.

Witnesses:
I. P. PIRSSON,
S. H. MAYNARD.